Aug. 24, 1943.   H. R. CARNEY   2,327,580
STORM-WINDOW WEATHER SEALING AND CLOSURE DEVICE
Filed March 13, 1942   3 Sheets-Sheet 1
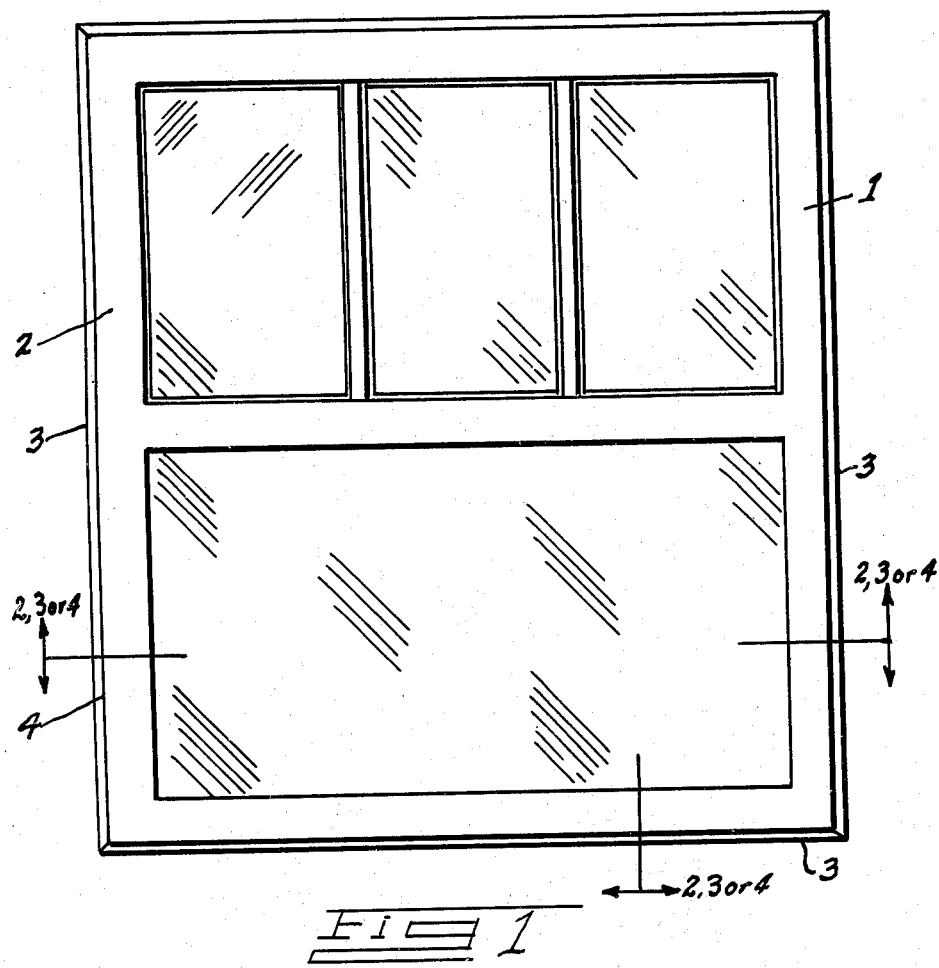
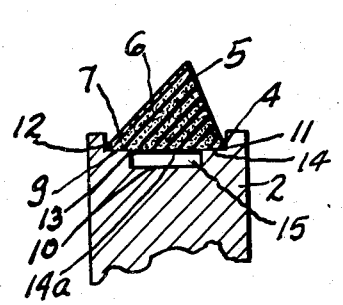
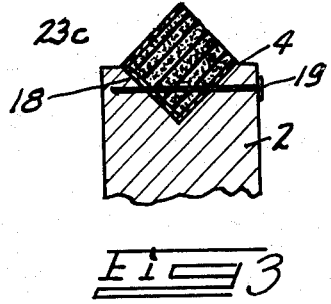
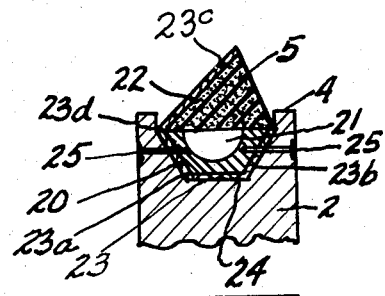
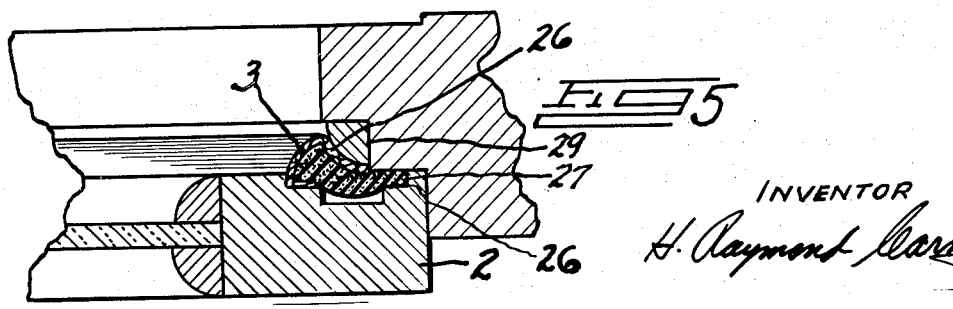
INVENTOR
H. Raymond Carney Aug. 24, 1943.  H. R. CARNEY  2,327,580
STORM-WINDOW WEATHER SEALING AND CLOSURE DEVICE
Filed March 13, 1942  3 Sheets-Sheet 2
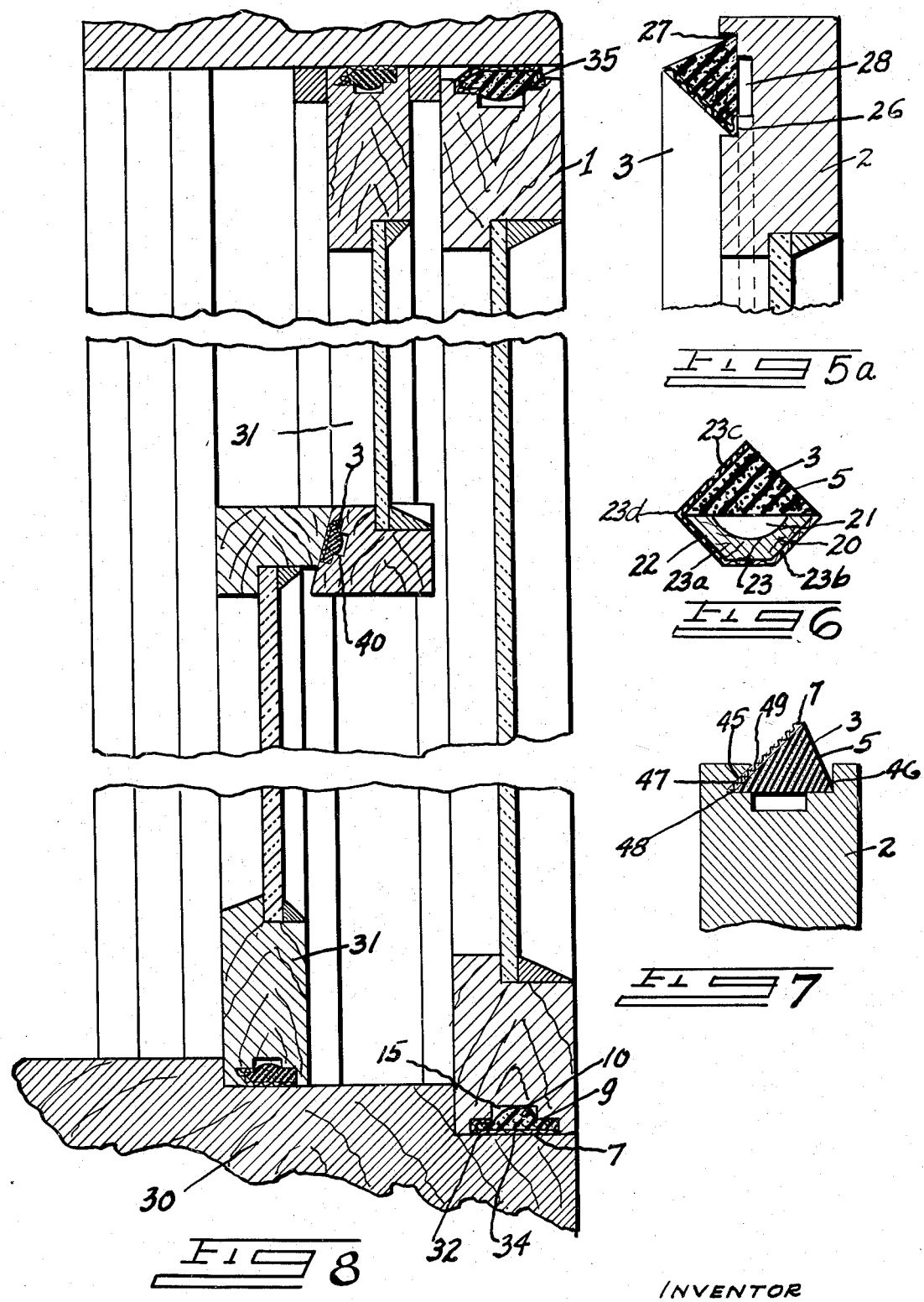
INVENTOR
H. Raymond Carney

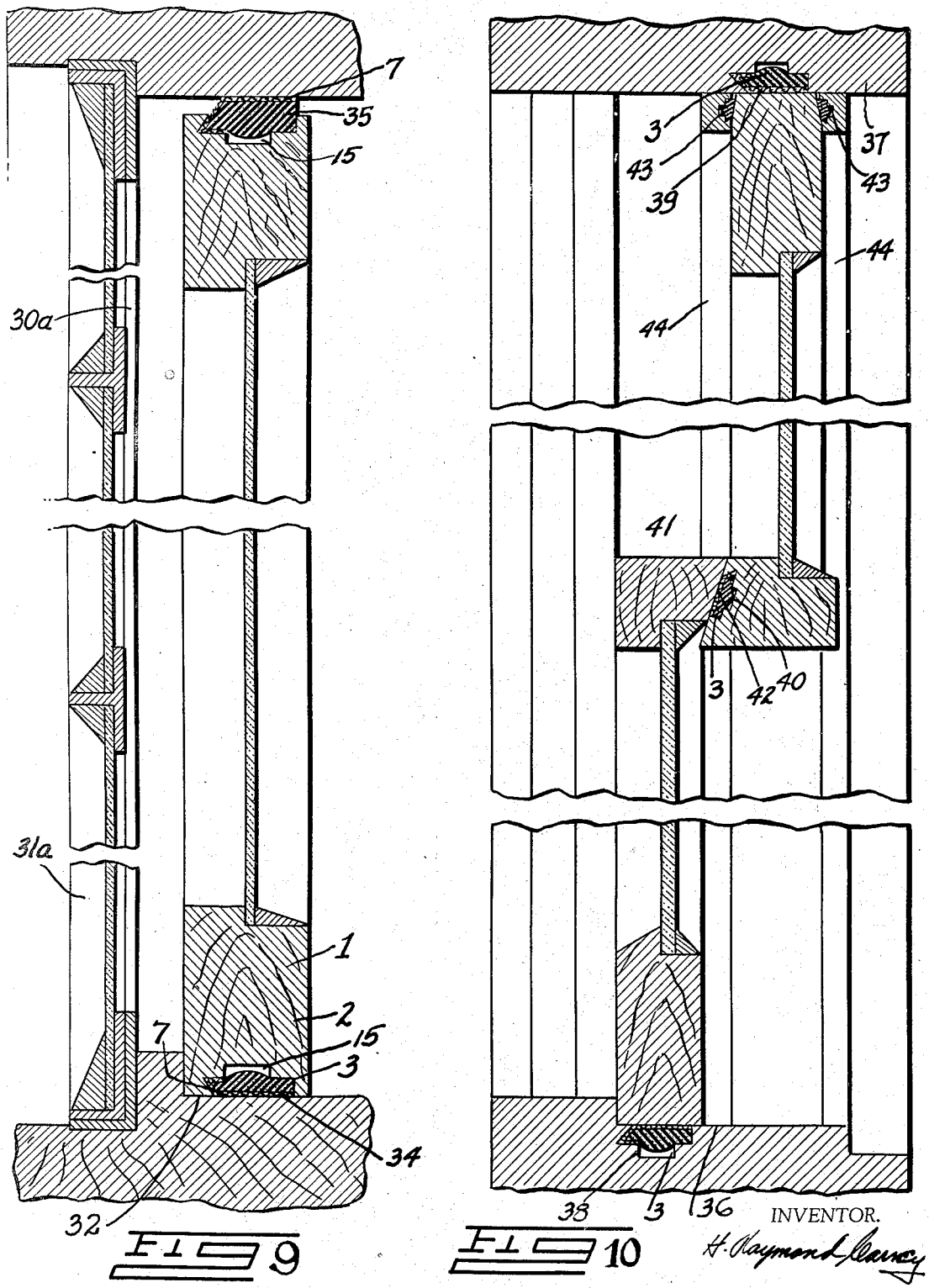

Patented Aug. 24, 1943

2,327,580

UNITED STATES PATENT OFFICE 2,327,580

STORM-WINDOW WEATHER SEALING AND CLOSURE DEVICE

Henry Raymond Carney, Oneida, N. Y.

Application March 13, 1942, Serial No. 434,518

5 Claims. (Cl. 20—69)

My invention relates to weather stripping and sealing devices to prevent leakage of air or fluids about the perimeter or joints of windows, doors and other openings where it is intended that there shall not be leakage of air or fluids.

It is an object of my invention to provide a compressible resilient solid sealing strip that will compress and adapt itself to the contour of the surface which it contacts and thereby close all possible openings and prevent leakage of air or fluids through these openings.

Another object of my invention is to provide a weatherstrip for storm-doors, windows and the like that can readily be attached to the perimeters and face surfaces of windows and the like and said weather stripping automatically insuring sealing against leakage upon placing said windows in place.

Another object of my invention is to provide a solid, resilient and compressible sealing means capable of automatic three dimensional adjustment to a surface in contact and upon removal from the surface contacted to assume its original shape without damage or in anyway be affected by a previous distortion.

I have found that the usual types of metal and flexible weather stripping when attached to windows, doors and other closure elements can not be disturbed without destroying their effectiveness to seal against leakage. This is especially true of metal types and others that depend upon bending and bearing pressure to seal against leakage. Practically all of the known types assume a permanent set and contour of the surface contacted and when flexed often produce openings and fail to seal against leakage. Metal sealing is limited to certain radii and are not completely effective. With my type of weather strip or sealing means bending and distortion do not in any manner effect its efficiency because of its resilience and readiness to be compressed and its ability to assume its original shape. Rupture of its structure being impossible since no permanent shape or set other than its original shape is possible. Therefore, regardless of the number of times it is pressed upon a surface it remains ready and free to function and close all possible openings that could cause leakage.

Further, my weather stripping is not limited to one plane but because of its internal structure it actually moulds itself to the contour of the surface it contacts and thereby insures sealing and closing off of the most minute openings.

While I have shown and described my invention especially as weather stripping it will readily occur to anyone skilled in the art that my sealing strip can be used for closing and sealing ship and building doors, windows and port holes, containers and the like against leakage. These and other objects will readily occur to those skilled in the art.

Referring to the drawings in which I illustrate various forms of my sealing strip embodying my invention:

Figure 1 is a front elevation of a storm-window showing the sealing strip around the perimeter.

Figure 2 is a fragmentary section of a window taken on line 2, 3 or 4 of Figure 1.

Figure 3 is a fragmentary section of a window showing a square shape for my sealing strip taken on lines 2, 3 or 4 of Figure 1.

Figure 4 is a fragmentary section of a window sash taken on line 2, 3 or 4 of Figure 1 showing another method of mounting my sealing strip.

Figure 5 is a fragmentary section showing my sealing strip on the front face of a window sash in place against a moulding of a window frame.

Figure 5a is a fragmentary section of a window sash showing my sealing strip attached to a face of the window sash and out of contact with a surface to be sealed.

Figure 6 is a section through my sealing strip showing another method of mounting prior to mounting on a window sash.

Figure 7 is an elevation in section of a window frame and sash with a storm-window shown in place.

Figure 8 is a sectional elevation of a steel window and storm sash in place.

Figure 9 is a sectional elevation of a steel window frame with a storm window in place.

Figure 10 is a sectional elevation of a window with the sealing strip mounted on the sash and window frame.

Throughout the description where similar parts are duplicated on the drawings the same indicia will identify these parts. I have shown a storm-sash 1 with outside frame 2 with my sealing strip 3 attached to the perimeter 4. Referring to Figure 2 it will be seen that the preferred sealing strip is composed of sponge rubber 5 of triangular shape. On one leg 6 of the triangle fixedly attached to the sponge rubber is a binding fabric 7 of muslin or canvas that acts as a controlling agent to keep the rubber when compressed within its limits and therefore within the groove and also provides relatively frictionless sliding surface. The fabric insures longer wear for the rubber when placing and working the sealing strip in contact with surfaces. The fabric extends unbrokenly over the entire leg 6 of the sealing strip. A strip 5 that is triangular in shape is glued to the lower portion of this canvas strip and to the wood surface where they contact to insure positive control of the rubber while under pressure. In this instance grooves 9 and 10 are provided in the perimeter 4 of the sash frame 2 for mounting the sealing strip. The apexes 11 and 12 are fixed on the ledges 13 and 14 of the groove 11 and the central suspended section 14a extends across the groove 10 and forms a pocket 15 into which excess of the sealing strip is free to expand when it bears against a surface.

Figure 3 shows the sealing strip 3 as a square shape and has the fabric 7 on the three sides. To mount this square sealing strip a triangular groove 18 is provided in the perimeter 4 of the window sash and a nail or brad 19 is provided to keep the sealing strip from moving longitudinally along the perimeter 4.

In Figures 4 and 6 I have shown my triangular shaped sealing strip 3 mounted on a truncated pyramidal shaped base 20 with a hollow portion 21. This method of mounting is preferred and facilitates mounting on the window frame. Fabric 22 extends around the sides 23, 23a and 23b of the base and continues up and around the side 23c of the sponge rubber 5 to provide a wearing, controlling and sliding surface for the sealing strip. With this type of mounting it is possible to have my sealing strip fixed on the base ready for mounting to a window frame. The binding fabric will enable the sealing strip and base to be hinged together at 23d thereby controlling the direction in which the compressed strip will move when the sealing strip is pressed into place on a window frame to seal against leakage. To conform to the base 20 a groove 24 is provided in the perimeter of the sash and the sealing strip is fastened to the sash by means of nails or brads 25 that prevent the sealing strip with its base from moving longitudinally along the sash.

In Figures 5 and 5a I have shown my triangular shaped sealing strip 3 in place on a face 26 of the frame 2. The sealing strip is mounted in the groove 27 and forms a pocket 28 into which excess rubber of the sealing strip is free to expand when compressed against a surface. Where desired the lower groove or pocket can be omitted and my sealing strip will function.

Referring to Figure 5 it will be seen that when the sealing strip 3 is pressed against an irregular shaped surface, such as a moulding 29, the sealing strip will take the shape of the irregular surface and insure the closing of any openings that may cause leaks. The sealing strip is free to assume any contour whatsoever and where the surface is irregular, both longitudinally and laterally, the sealing strip will bend and expand readily in any direction into any of the crevices, raises or depressions. As a matter of fact that it can be seen that the more irregular the surface the better will it seal such openings.

In Figures 8 and 9 I have shown window frames 30 and 30a of wood and steel respectively with the usual sliding and swinging sashes 31 and 31a. Customarily there is a step-off 32 that forms an enlarged opening into which a storm-window can be inserted. At the bottom 34 it can be seen what shape is taken by my sealing strip. The fabric 7 contacts a surface 34 and the rubber presses it down against this surface closing any cracks or openings and any excess rubber not needed will expand into the pocket 15 and thereby maintain the proper pressure. The sealing strip only partially supports the window which rests on the surface 34. On the upper portion the sealing strip will assume the shape as shown at 35 and sufficient pressure necessary to close any openings will be applied. The same condition occurs along the sides of the window. Should the storm sash be a close fit then the rubber would expand into the pocket 15 and prevent any excess pressure on the sealing strip that could cause distortion. From the drawings and description it can be seen that with the use of my sealing strip the installation of windows or doors bound with my sealing strip is very readily accomplished and the mere insertion into place causes sealing against leakage.

Referring to Figure 10 it will be seen that the sealing strip 3 is mounted in the sill 36 and head piece 37. Pockets 38 and 39 are provided in the sill and head piece similar to the grooves or pockets 15 on the window frame. When the sash is pressed against the sealing strip sealing will be accomplished. A groove or pocket 40 is provided in the surface 41 of the window sash and the sealing strip 3 is fixed therein. The contour of this groove is similar to the groove or pocket 15 and has the same function as previously explained. When the upper sash slides up, the sealing strip 3 contacts the surface 42 of the lower sash and any openings will be closed by the pressure of the sealing strip against the surface 42. Similarily my sealing strip is shown mounted in grooves or pockets 43 in the guide rails 44 as an additional sealing surface at the top of the window. The sealing strip can be mounted along the entire length of the guide rails 44.

Referring to Figure 7 it will be seen that one side 45 of the groove 46 has a V shaped side wall 47 into which an apex 48 of the sealing strip is fixed by means of a proper adhesive. This method of mounting produces a hinge like action at the point 49 between the sealing strip and side wall of the pocket or groove. The V shaped section provides a wedge like fastening means for mounting my sealing strip to the window frame.

While I have illustrated my sealing strip as made of sponge rubber I have found that rubberized or moisture proofed cotton and hair felts can also be used.

Having thus described my invention what I claim as new and desire to secure by Letters Patent is:

1. A solid triangular sealing strip of resilient compressible material, a base for fixedly mounting said sealing strip, a groove in said base providing a pocket for part of said sealing strip when said strip is under pressure and a binding material fixed to a face of said triangular sealing strip and extending and fixed around the exposed face of said base.

2. A solid sealing strip of resilient compressible material, a base for mounting said sealing strip, a cavity in said base adapted to receive part of said sealing strip when said sealing strip is under pressure and binding means about said sealing strip and base to fixedly attach said sealing strip to said base.

3. A solid triangular sealing strip of resilient compressible material, a base for said sealing strip, a cavity in said base for receiving part of said sealing strip when said sealing strip is under pressure, said sealing strip being loosely mounted on said base and binding material fixed to one side of said sealing strip and extending around and fixed to the face of said base, said binding providing controlling and sliding surface and a hinge member between said sealing strip and base.

4. A solid triangular sealing strip of resilient compressible material, a truncated hollow base having side walls to support said sealing strip, a binder fixed to said sealing strip and extending around and fixed to said base to provide a controlling and sliding surface for said sealing strip and a hinge between said sealing strip and base supporting said sealing strip.

5. In combination with a frame having grooves, a grooved means having an outer contour to conform to said first grooves, a solid resilient compressible means supported on said grooved means, a binding means fixed to said solid resilient compressible and grooved means to provide a hinge between said frame and solid resilient compressible means when said grooved means is fixed in said grooves of said frame.

H. RAYMOND CARNEY.